Jan. 18, 1949.    W. D. CARRIE    2,459,682
ROTARY PLUG VALVE
Filed Nov. 12, 1943    12 Sheets-Sheet 1

Inventor:
William D. Carrie
By Joseph O. Lange Atty.

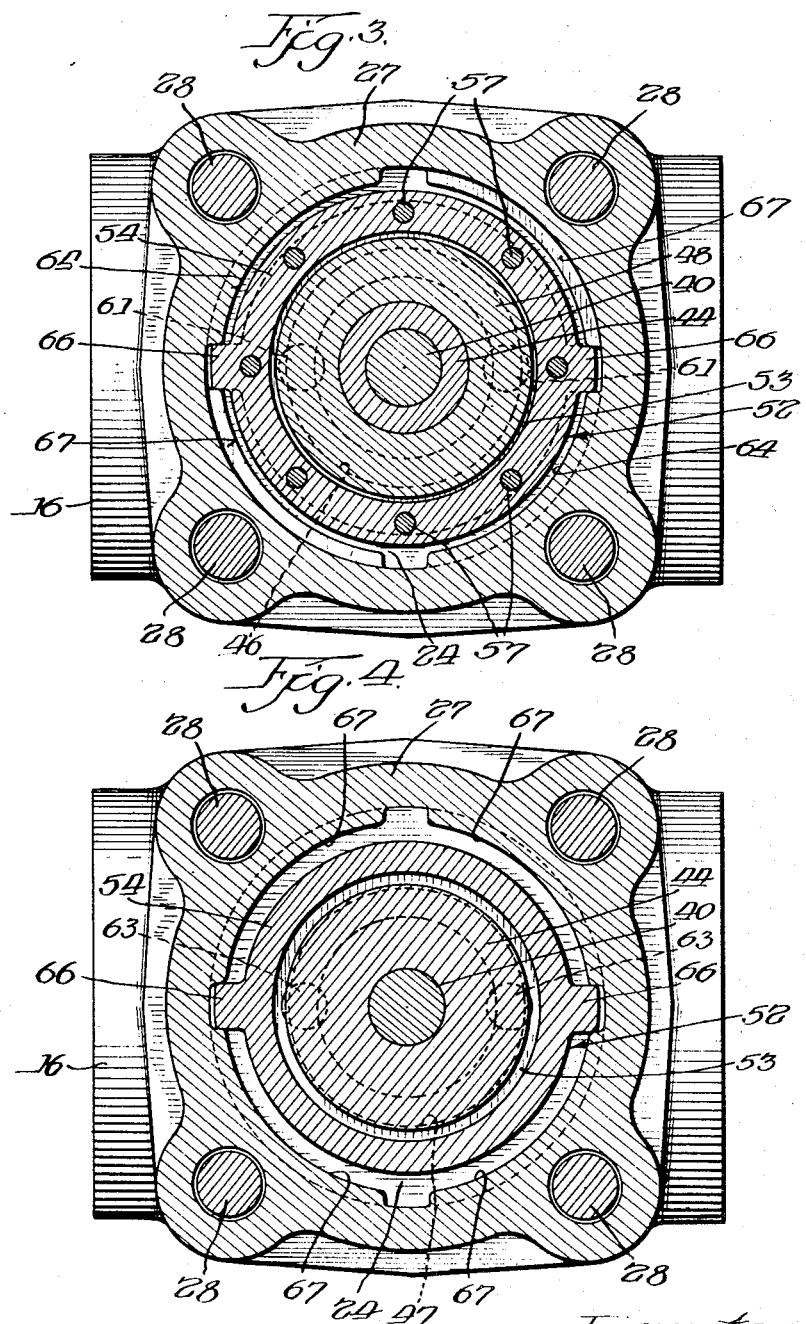

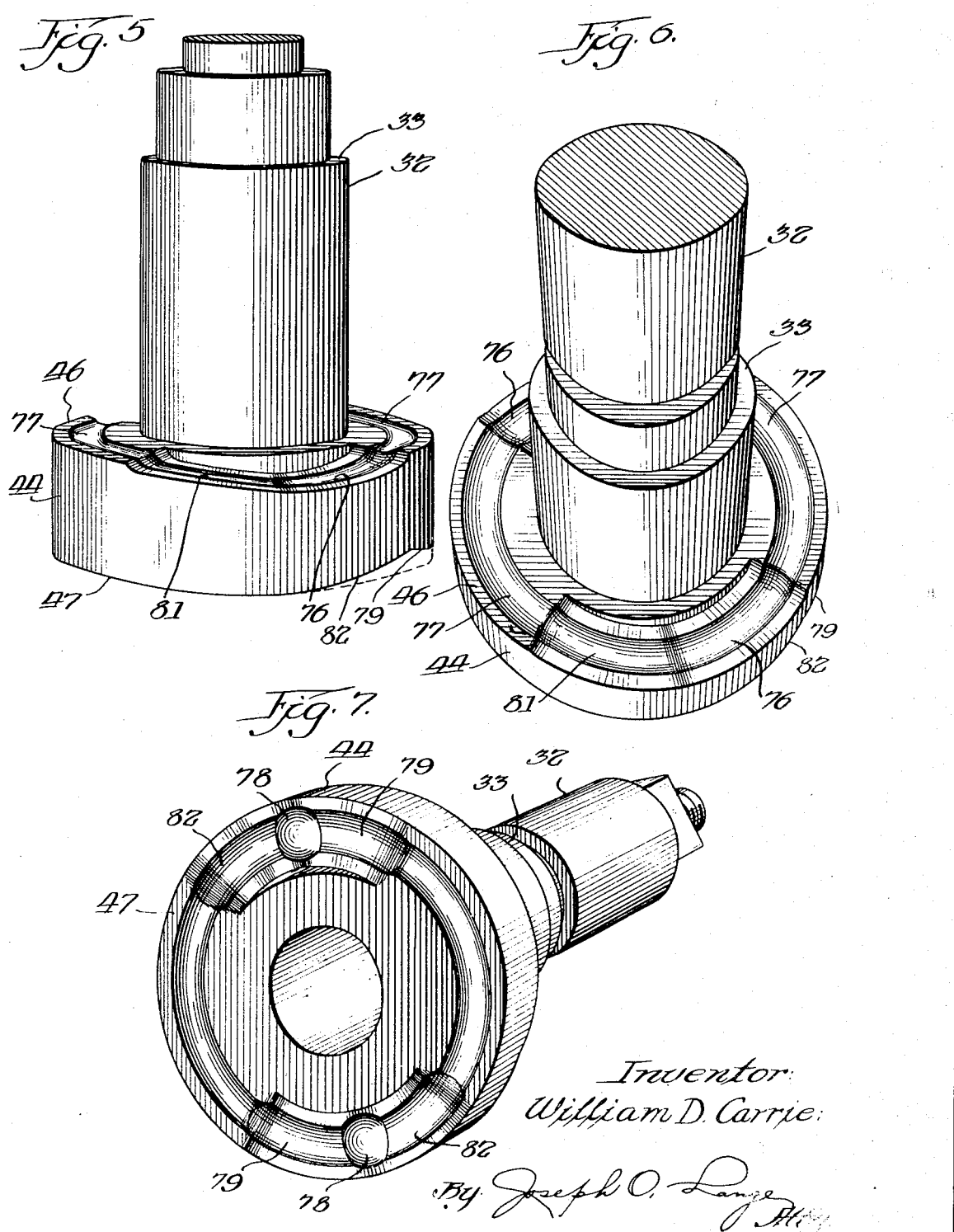

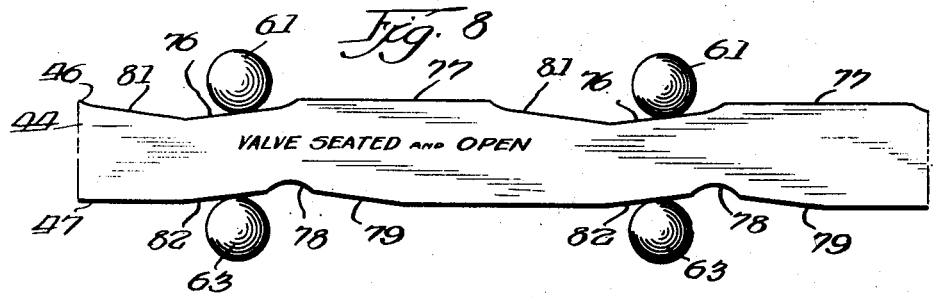
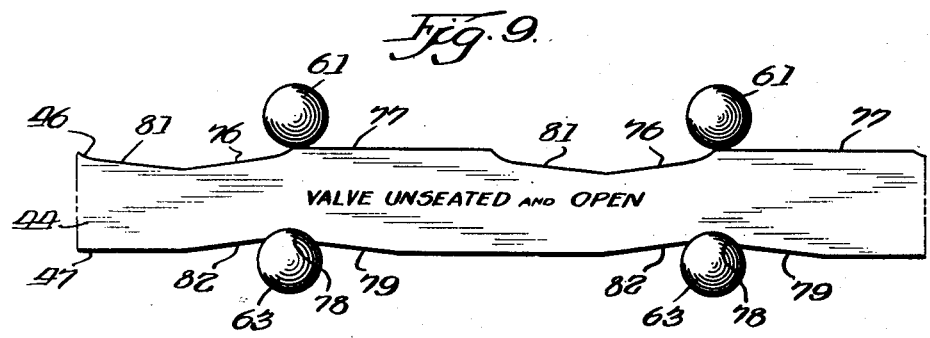
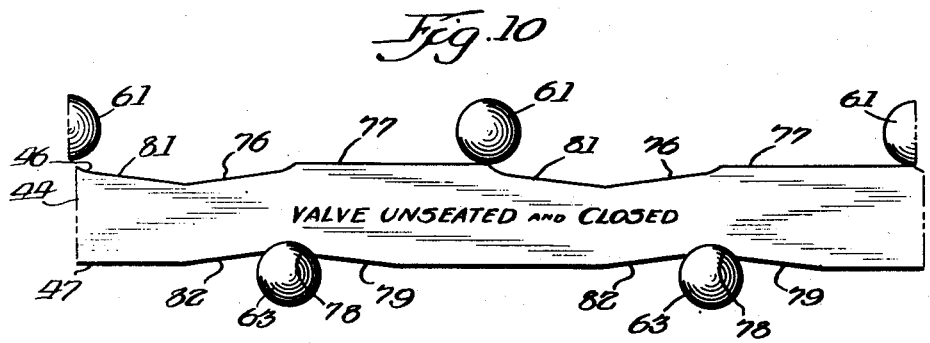
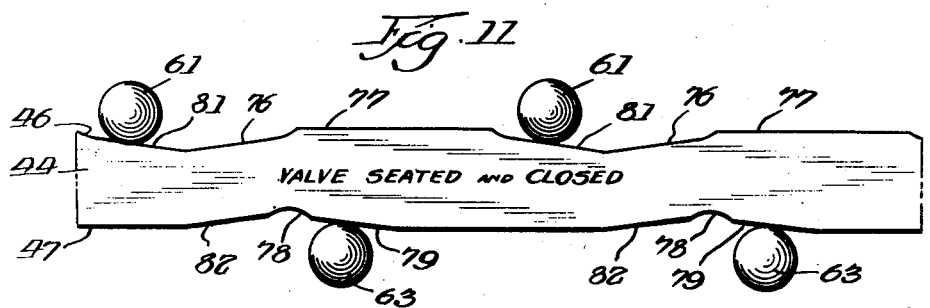

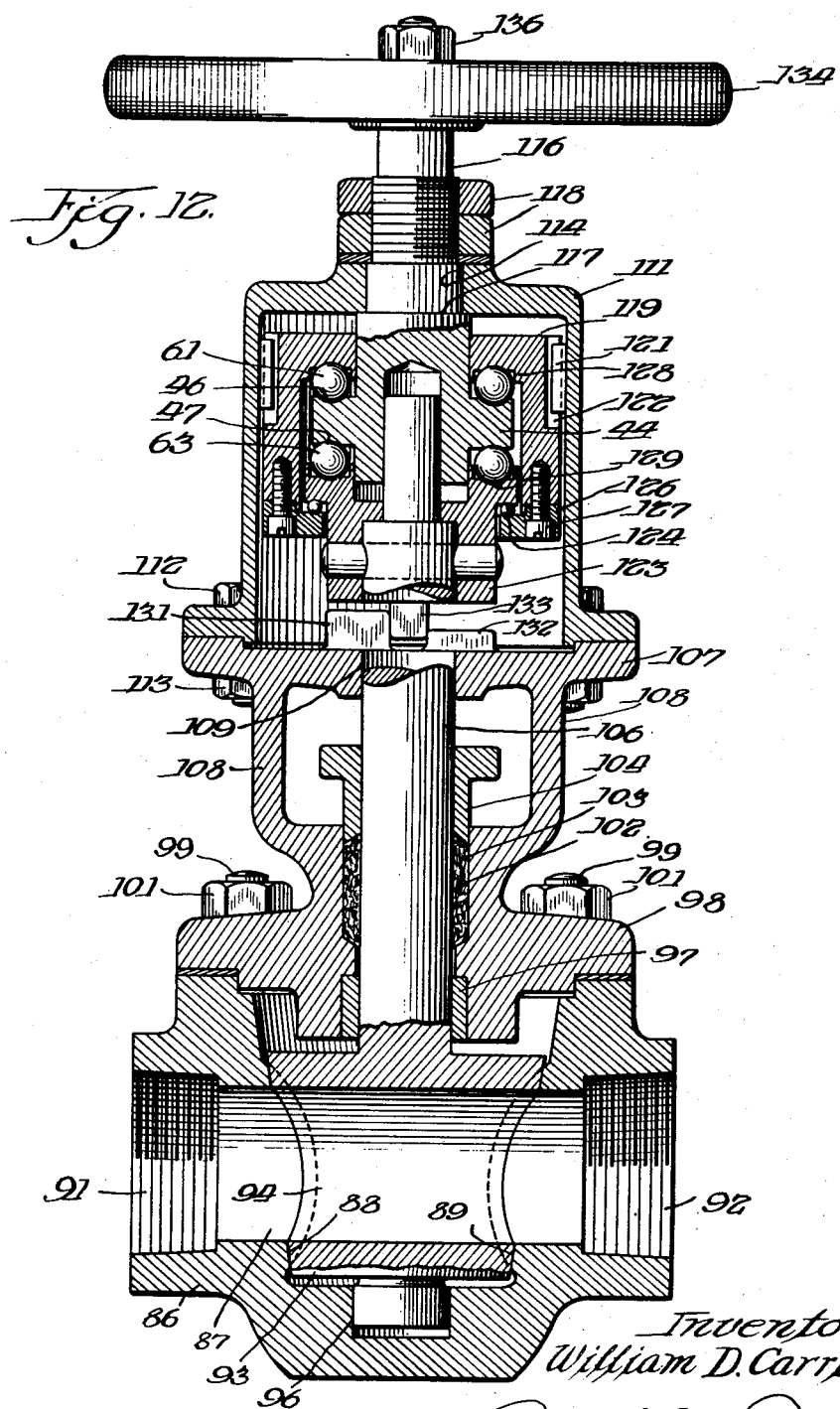

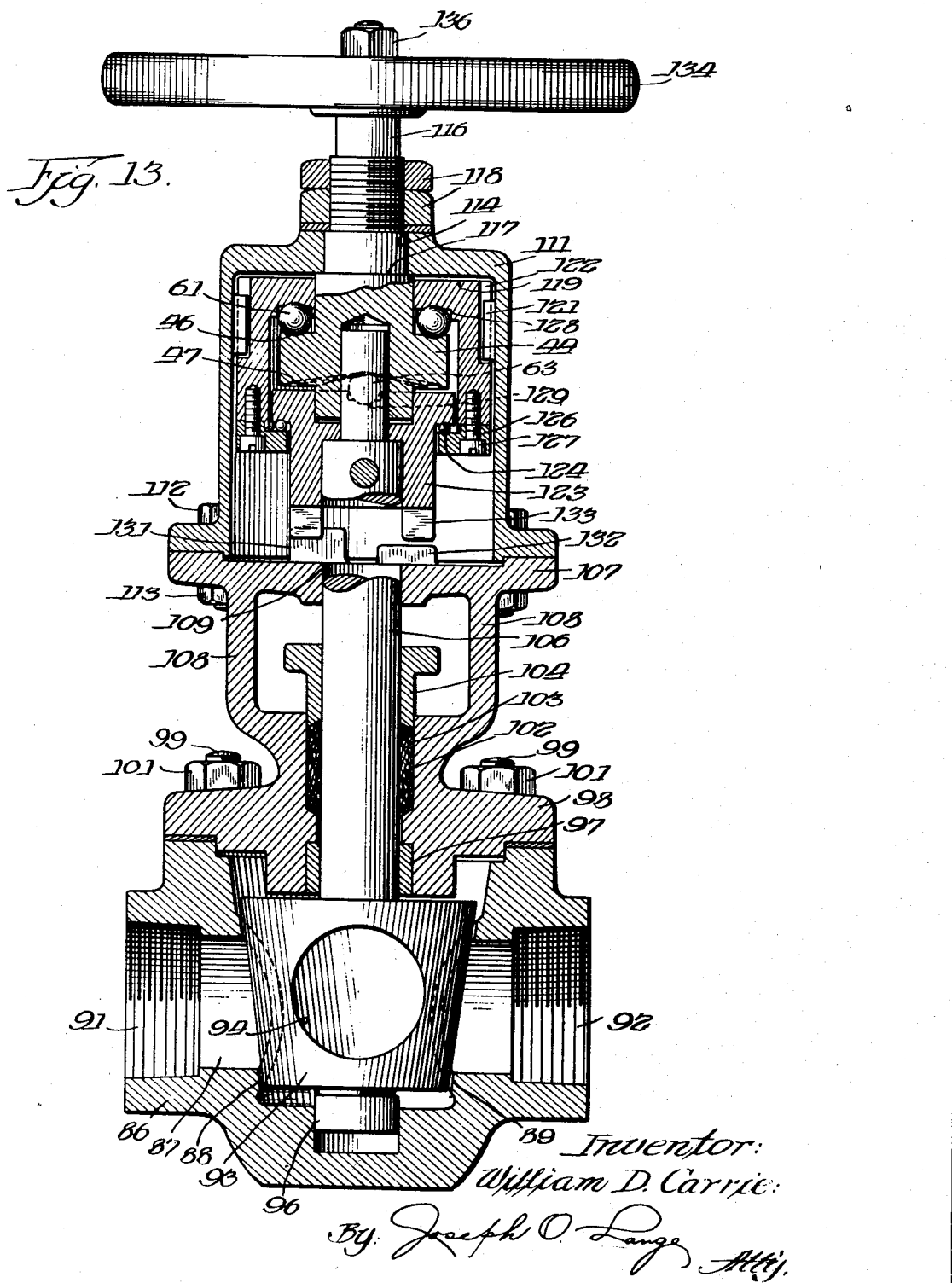

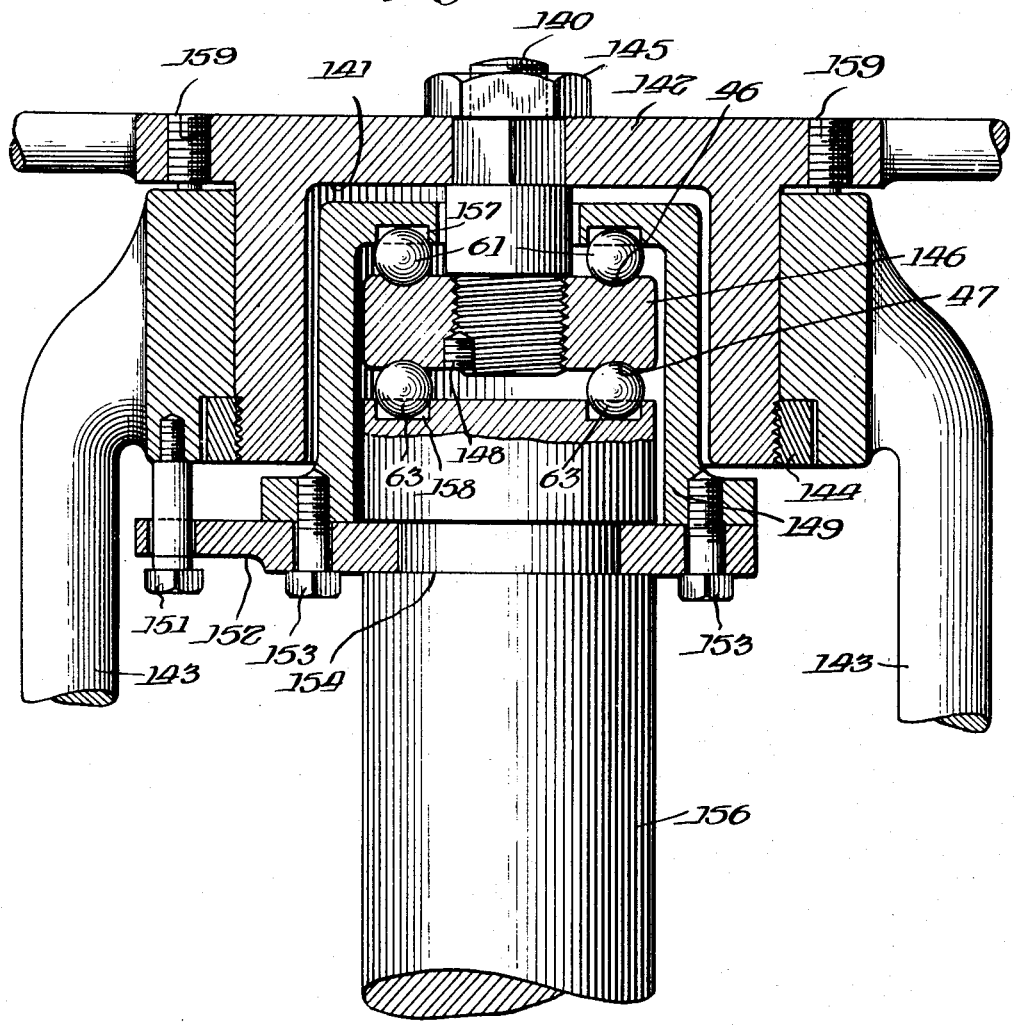

Jan. 18, 1949. W. D. CARRIE 2,459,682
ROTARY PLUG VALVE
Filed Nov. 12, 1943 12 Sheets-Sheet 9

Inventor:
William D. Carrie
By Joseph O. Lange Atty.

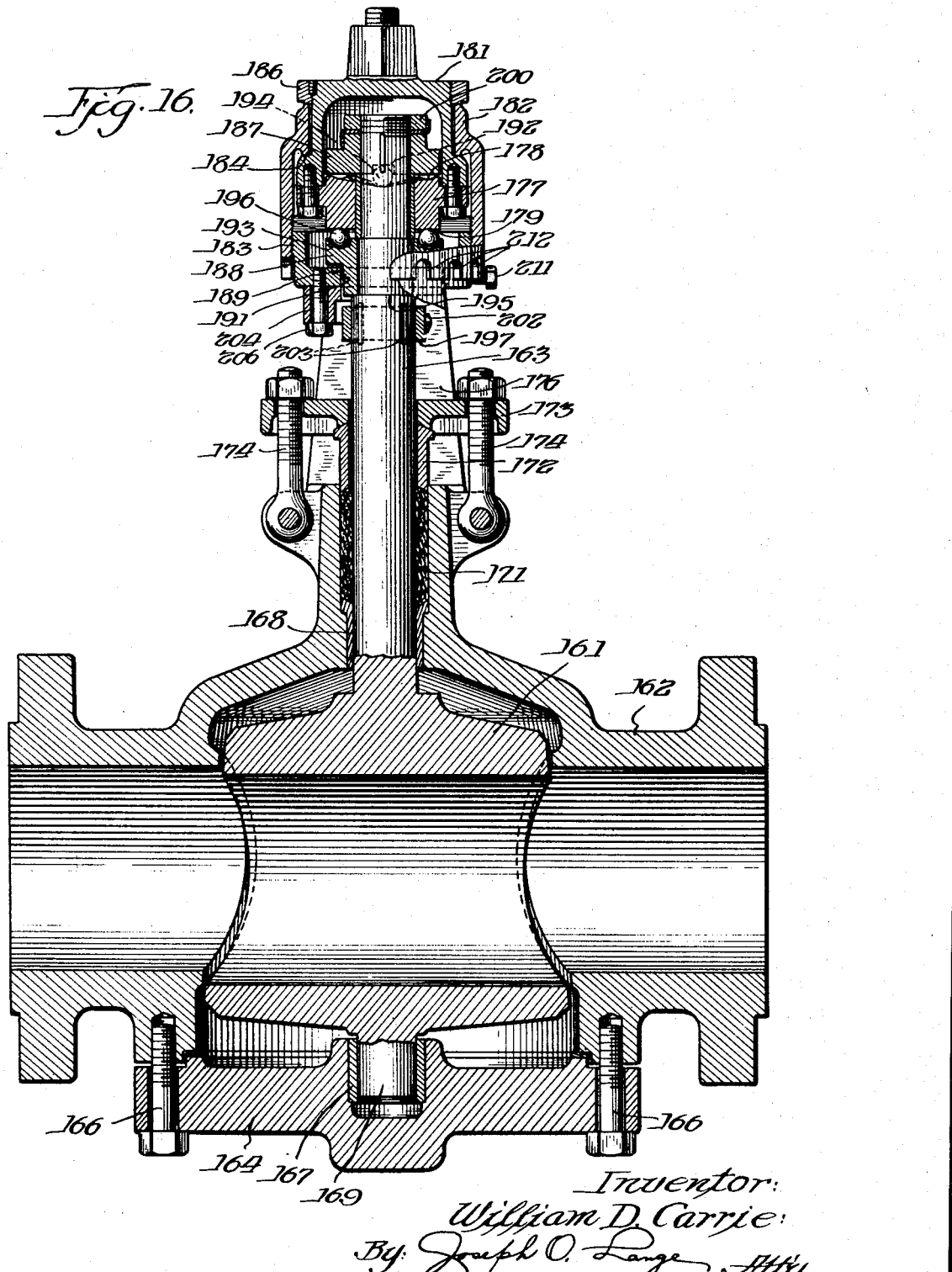

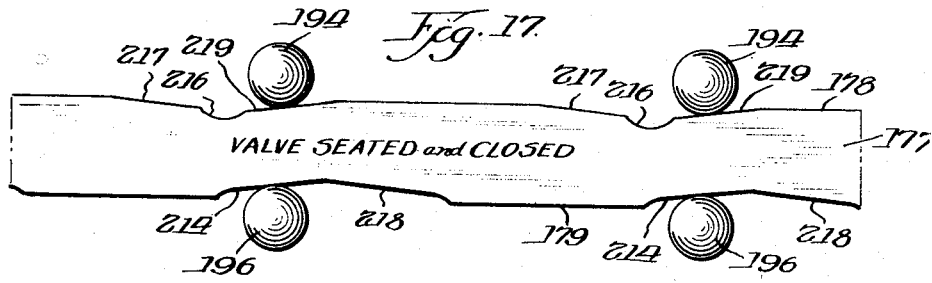
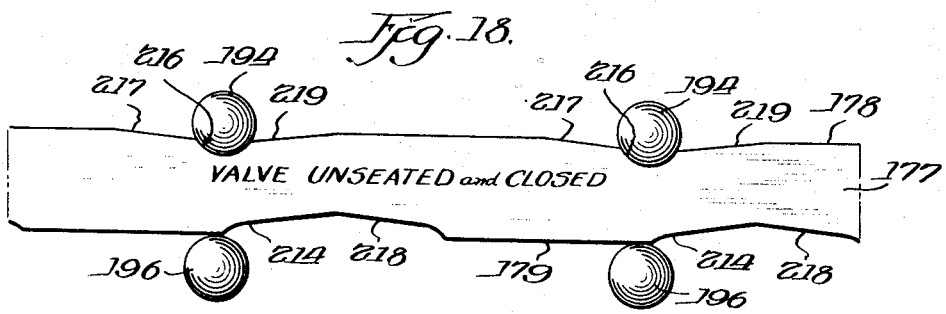
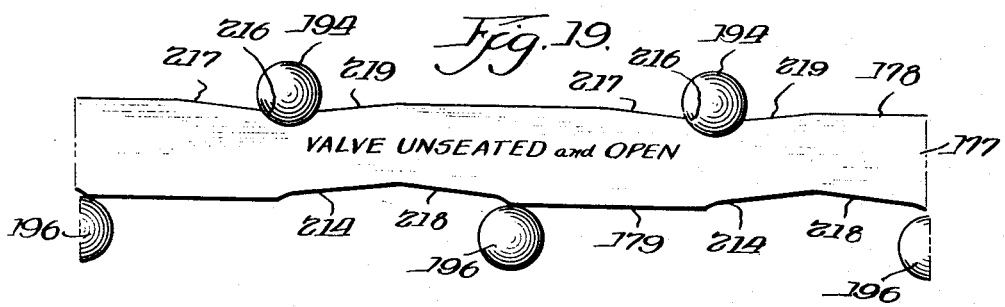
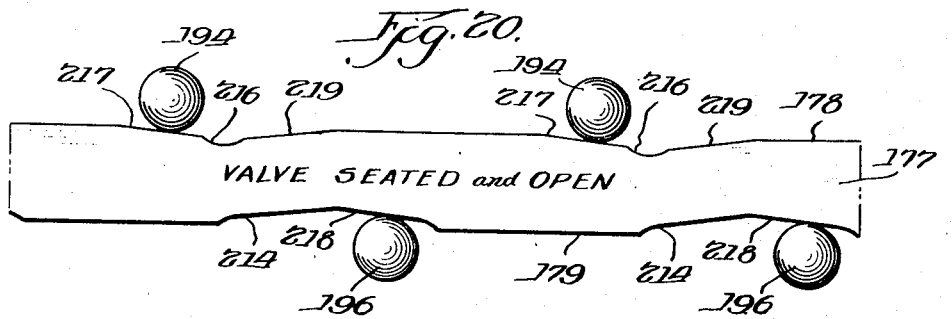

Jan. 18, 1949. W. D. CARRIE 2,459,682
ROTARY PLUG VALVE
Filed Nov. 12, 1943 12 Sheets-Sheet 12
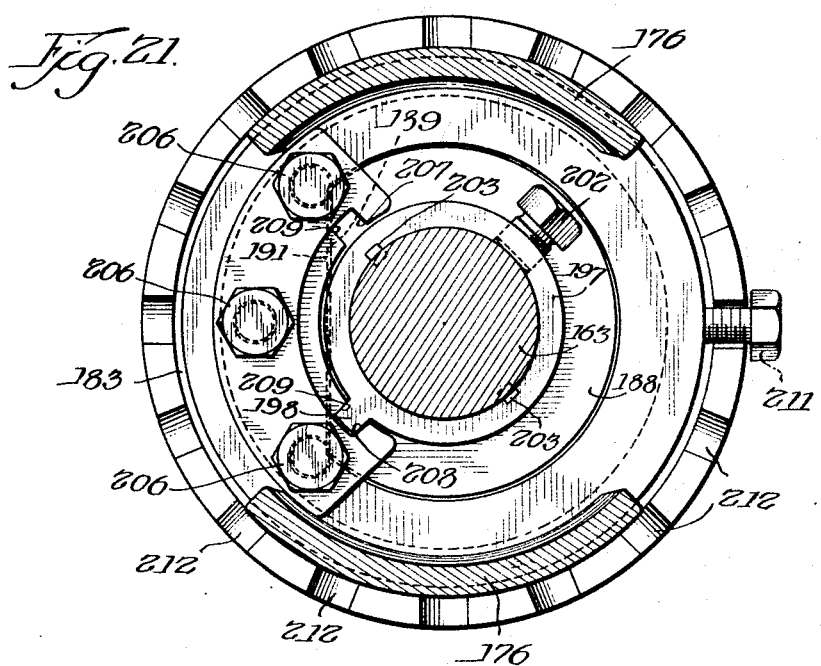
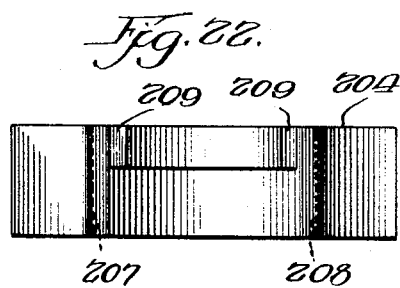
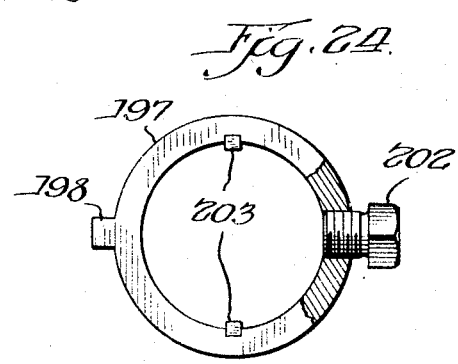
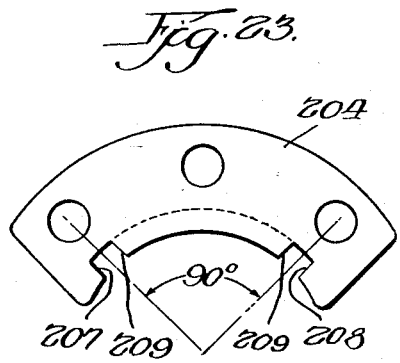
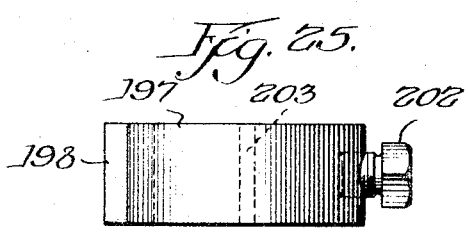
Inventor:
William D. Carrie
By Joseph O. Lange Atty.

Patented Jan. 18, 1949

2,459,682

UNITED STATES PATENT OFFICE 2,459,682

ROTARY PLUG VALVE

William D. Carrie, Lisle, Ill., assignor to Crane Co., Chicago, Ill., a corporation of Illinois Application November 12, 1943, Serial No. 510,052

7 Claims. (Cl. 74—22)

This invention relates to rotary plug valves and is more particularly concerned with valves of this type in which means are provided for lifting, turning and then reseating the plug in the body when opening or closing the valve, and has for an object the provision of an improved plug actuating means which is simple in construction, reliable in operation and which will not readily get out of order.

This invention further contemplates the provision of improved plug actuating means embodying a cam member journaled for rotational movement and having a pair of coacting cam surfaces for unseating, turning and reseating the plug.

This invention further contemplates the provision of a cam member provided on a handwheel stem and interposed between a plug engaging sleeve and the valve plug; and in which one side of the cam member acts through the sleeve for lifting the plug from its seat in the body, and the other side of the cam member acts downwardly against the plug for reseating same. After the plug is in lifted position, the two sides of the cam member coact to provide for a direct, positive rotational movement of the plug to its reseating position.

Another object of my invention is to provide an arrangement of parts whereby a plug actuating mechanism of this type may be compactly enclosed by a cup-shaped portion formed on the plug and within the bonnet of the valve.

A further object of my invention resides in the provision of an arrangement of parts whereby the plug actuating mechanism is disposed within a housing mounted on top of the bonnet.

A still further object of my invention is the provision of a plug actuating mechanism disposed within a handwheel which, in turn, is journaled for rotational movement in a yoke bonnet.

My invention embodies other novel features, details of construction, and arrangement of parts which are hereinafter set forth in the specification and claims and illustrated in the accompanying drawings, forming part thereof, wherein:

Fig. 3 is a sectional view taken along the line 3—3 of Fig. 1, showing the stop means for limiting the rotational movement of the plug between its open and closed positions;

Fig. 4 is a sectional view taken along the line 4—4 of Fig. 1, showing the guide means for directing the plug vertically during its initial unseating movement;

Fig. 5 is a fragmentary perspective view of the operating stem and cam member formed thereon as viewed from the side;

Fig. 6 is a fragmentary perspective view of the operating stem and cam member formed thereon as viewed from its upper end;

Fig. 7 is a perspective view of the operating stem and cam member formed thereon as viewed from its lower end;

Fig. 8 is a view showing the longitudinal development of the cam surfaces and the relative positions of the balls engaging same when the plug is in open and seated position;

Fig. 9 is a view similar to Fig. 8, showing the relative positions of the balls when the plug is in open and unseated position;

Fig. 10 is a view similar to Fig. 8, showing the relative positions of the balls when the plug is in closed and unseated position;

Fig. 11 is a view similar to Fig. 8, showing the relative positions of the balls when the plug is in closed and seated position;

Fig. 12 is a longitudinal sectional view showing a modified form of rotary plug valve in open position and embodying features of this invention and in which the plug actuating mechanism is disposed above the bonnet of the valve;

Fig. 13 is a view similar to Fig. 12, showing the valve in closed and unseated position;

Fig. 14 is a vertical sectional view showing a further modification of this invention wherein the plug actuating mechanism is disposed within a handwheel;

Fig. 16 is a view similar to Fig. 15, showing the plug in open and unseated position;

Fig. 17 is a view showing the longitudinal development of the cam surfaces and the relative positions of the balls engaging same when the plug is in closed and seated position, as shown in Fig. 15;

Fig. 18 is a view similar to Fig. 17, showing the relative positions of the balls when the plug is in closed and unseated position;

Fig. 19 is a view similar to Fig. 17, showing the relative positions of the balls when the plug is in open and unseated position;

Fig. 20 is a view similar to Fig. 17, showing the relative positions of the balls when the plug is in open and seated position;

Fig. 21 is a sectional view taken along the line 21—21 of Fig. 15;

Fig. 22 is a side elevational view showing the stop member employed in the modified form of valve shown in Fig. 15;

Fig. 23 is a plan view of same;

Fig. 24 is a detail plan view showing a stop collar employed for use with the stop member illustrated in Figs. 21 and 22; and Fig. 25 is a side elevational view of same.

Figure 1:
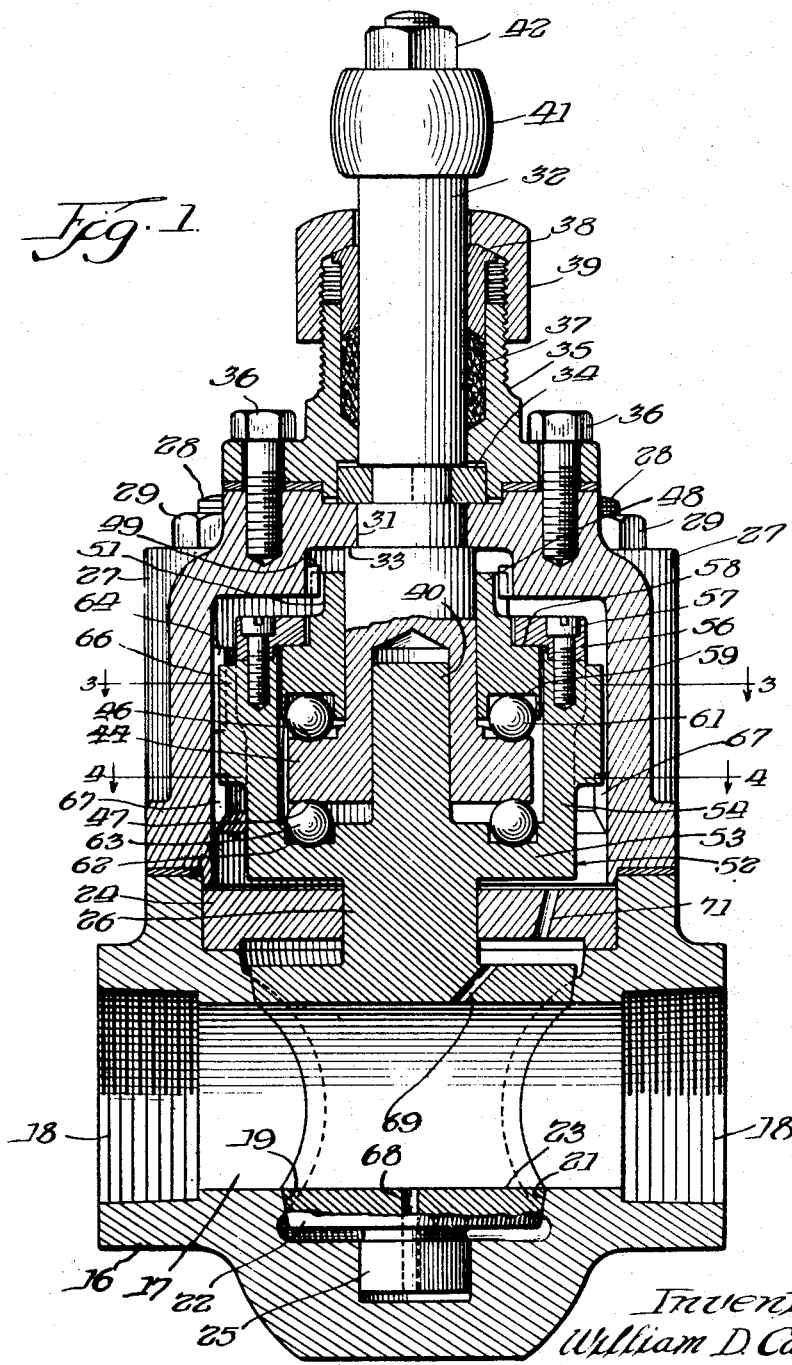
Fig. 1 is a longitudinal sectional view showing one form of rotary plug valve in open position and embodying features of this invention and in which the plug actuating mechanism is disposed within the bonnet of the valve.
Figure 2:
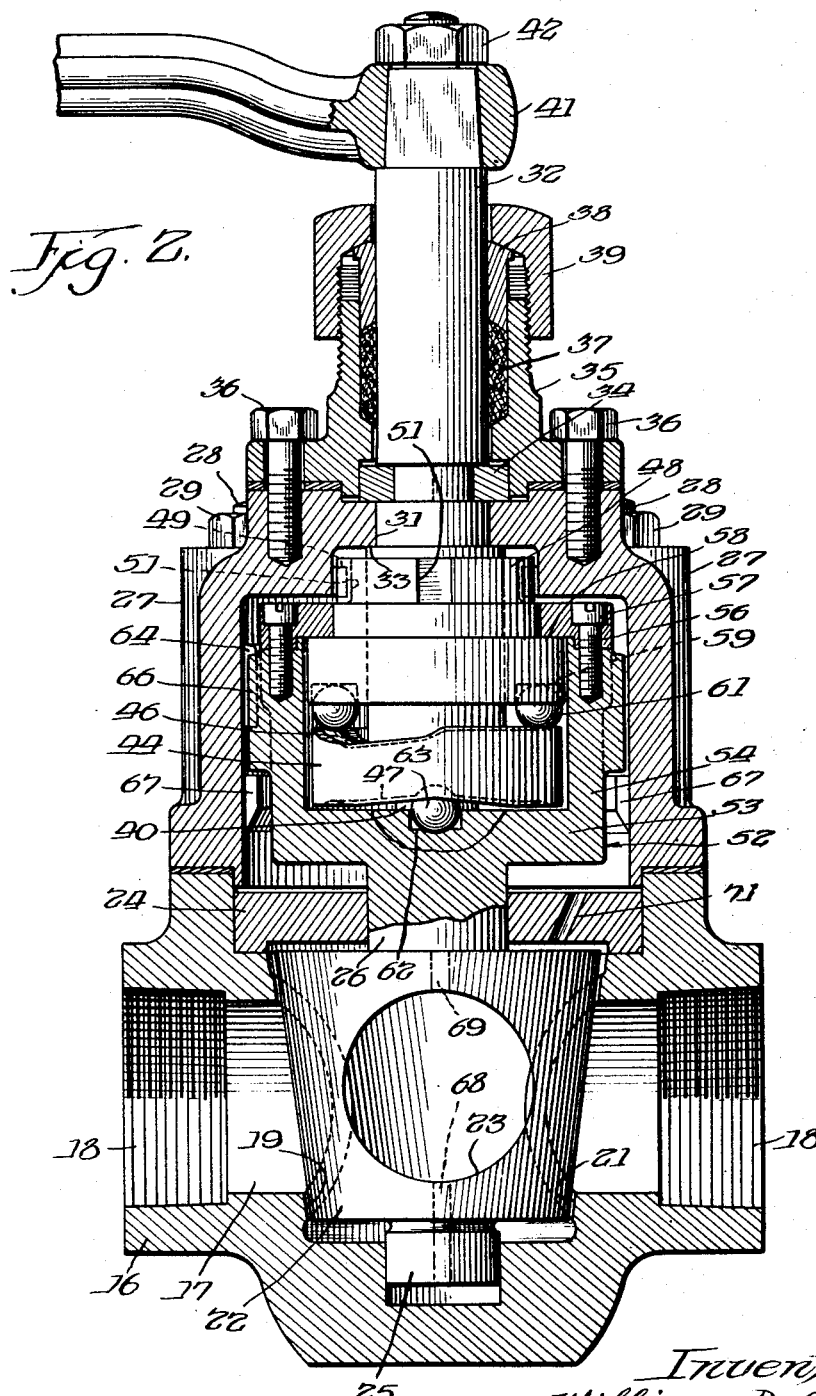
Fig. 2 is a view similar to Fig. 1, showing the valve in closed and unseated position.

Referring now to the drawings for a better understanding of this invention and more particularly to Figs. 1 to 11 inclusive therein, the first form of the invention is shown comprising a body 16 having a passage 17, threaded ends 18, and seats 19 and 21. A plug 22 having a port 23 is journaled for axial and rotational movement between the seats 19 and 21. A bearing recess is formed in the body to receive a journal 25 formed on the plug, and a split collar 24 is mounted in the neck of the body and provided with a bearing surface to receive a journal 26 formed on the plug. A bonnet 27 is secured to the body by means of studs 28 and nuts 29 and is provided with a bearing 31 to receive an operating stem 32. The operating stem is free to rotate but is held against axial movement by its shoulder 33 and split collar 34. A stuffing box 35 is secured to the bonnet by means of screws 36 and embodies the usual packing 37, gland 38, and gland nut 39. An operating handle 41 is secured to the stem 32 by a nut 42. The lower end of the stem is journaled on the plug at 40.

The plug actuating mechanism comprises a cam portion 44 provided on the operating stem and having an upper cam surface 46 and a lower cam surface 47. A sleeve 48 is mounted for axial movement on the stem and is held against rotational movement by lugs 49 formed on the bonnet and engaging in slots 51 provided in the sleeve. The plug is provided with a cup-shaped portion 52 having a bottom 53 and wall 54. A flange member 56 is secured to the top of the wall 54 by means of screws 57 and engages the shoulder 58 formed on the sleeve 48. Ball retaining pockets 59 are formed in the sleeve to receive balls 61 for point contact with the upper cam surface 46, and pockets 62 are provided in the bottom portion 53 to receive balls 63 for point contact with the lower cam surface 47. Stop lugs 64 are provided on the bonnet for engagement by lugs 66 formed on the wall 54 to limit the rotational movement of the plug. Guide lugs 67 are provided on the bonnet to receive the stop lugs 66. It is desirable to provide vents 68 and 69 in the plug and vent 71 in the split collar 24.

As the contour of the cam surfaces 46 and 47 determine the axial or rotational movement of the plug, a detail description of same has been embodied in the following description of the valve operation in which the valve is closed by a clockwise movement of the handle 41 and is opened by a counter-clockwise movement. In the operation of the valve from its open position shown in Fig. 1 to its closed position shown in Fig. 2, the handwheel is turned in a clockwise direction to raise the plug vertically from its seats by means of the cam incline portions 76 and the plug is held against rotational movement during its initial unseating movement by means of the guide lugs 67. Figs. 8 and 9 illustrate the relative positions of the balls on the cam surfaces when the valve is open and seated and when the valve is open and unseated, respectively.

Rotational movement of the plug from its open position to its closed position is accomplished by providing horizontal cam surfaces 77 for the balls 61 and indentations 78 for the balls 63, as illustrated in Figs. 9 and 10.

Reseating of the plug is accomplished by means of the cam decline portions 79 acting against the balls 63 after same have been released from the indentations 78 by the downward movement of the balls 61 from the horizontal cam surfaces 77, as illustrated in Figs. 10 and 11.

When the valve plug is moved from its closed position to its open position, the cam incline surfaces 81 first act against the balls 61 to unseat the plug; then the horizontal cam surfaces 77 and indentations 78 act through the balls 61 and 63 respectively to rotate the plug; then the cam decline portions 82 act through the balls 63 to reseat the plug.

Figs. 12 and 13 disclose a modified form of this invention in which a body 86 is provided with a passage 87, seats 88 and 89, and threaded ends 91 and 92. A plug 93 having a port 94 is journaled for axial and rotational movement between the seats 88 and 89 in bearings 96 and 97 provided in the body and a bonnet 98 respectively. The bonnet is secured on the body by studs 99 and nuts 101 and provided with a stuffing box 102, packing 103, and gland 104 to receive the plug stem 106. The bonnet is formed with a plate portion 107 which is supported on arms 108 and formed with a bearing aperture 109 to receive the upper end of the stem 106. A housing 111 is secured on the plate portion 107 by bolts 112 and nuts 113 and formed with a bearing aperture 114 to receive an operating stem 116 which is held against axial movement by a shoulder 117 and nuts 118.

A sleeve 119 is mounted for axial movement within the housing and is held against rotary movement by lugs 121 on housing engaging in slots 122 provided in the sleeve. A head portion 123 is secured on the upper end of the plug stem and formed with a shoulder 124 for engagement by a flange 126 mounted on the sleeve by screws 127. Ball retaining pockets 128 and 129 are formed in the sleeve 119 and head portion 123, respectively, to receive balls 61 and 63 for engagement with cam surfaces 46 and 47 heretofore shown and described. Guide lugs 131 and 132 are provided for engagement with a lug 133 to prevent rotational movement of the plug during initial unseating movement. A handwheel 134 is secured to the operating stem by a nut 136 and is turned in a clockwise direction to close the valve and in a counter-clockwise direction to open the valve. As the operation of this form of valve is the same as the form shown in Figs. 1 to 11, the description of the operation will not be repeated here.

Fig. 14 shows a further modification of this invention in which the plug actuating mechanism is disposed within a recess 141 formed in a handwheel 142 which is journaled between yoke arms 143 and held against axial movement by a nut 144. A cam member 146 having cam surfaces 46 and 47 is threaded onto a stud 140 secured to the handwheel by a nut 145. A set screw 148 prevents displacement of the cam member from the stud 140. A sleeve 149 is mounted for axial movement and is held against rotational movement by a screw 151 which engages a split cap 152 secured to the sleeve by screws 153. The cap engages in a circumferential groove 154 formed in the plug stem 156 for axial movement therewith. Ball retaining pockets 157 and 158 are formed in the sleeve 149 and stem 156, respectively, to receive balls 61 and 63, respectively, for engagement by the cam surfaces 46 and 47, respectively. Adjustment screws 159 are provided in the handwheel for adjusting the plug and its actuating mechanism axially with respect to the valve seats to insure proper seating of the plug in the seats. The operation of this form of valve construction is the same as heretofore set forth in the description of the form shown in Figs. 1 to 11.

Figure 15:
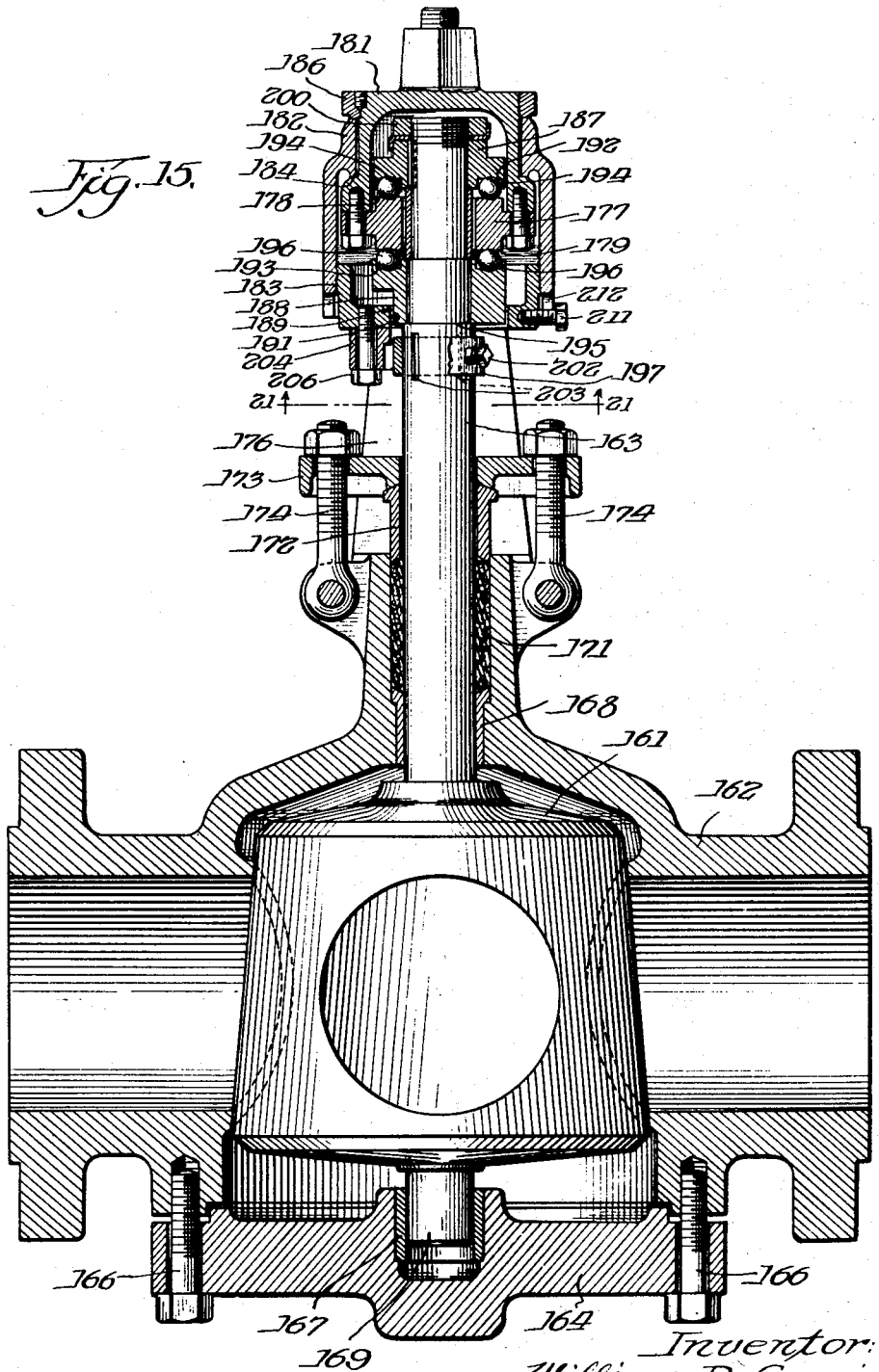
Fig. 15 is a vertical sectional view showing a further modification of this invention in which the plug is inverted and shown in closed and seated position.

Referring now to Figs. 15 to 20, I show a further modification of this invention in which a plug 161 is inverted in a body 162 and provided with a stem 163. A cap 164 is secured to the body by means of screws 166 to close the plug opening. Bearings 167 and 168 are provided in the cap and body, respectively, to receive the journal 169 and stem 163, respectively. A stuffing box 171 is formed in the body to receive the stem and embodies the usual gland 172, gland flange 173, and gland flange bolts 174.

A yoke 176 is secured to the body to support a plug actuating mechanism comprising a cam 177 having cam surfaces 178 and 179. The cam is secured to a handwheel member 181 journaled in a sleeve 182 which is threaded onto the yoke at 183. The member 181 is held against axial movement by a shoulder 184 and a nut 186. A ball retainer 187 is keyed to the stem 163 for rotational movement therewith, and a ball retainer 188 is journaled on the stem and held against rotational movement with respect to the yoke by forming a flat side 189 on the retainer for engagement with a flat side formed in the opening 191 provided in the yoke. The ball retainers are held against axial movement on the stem by means of a shoulder 195 and a nut 200. Ball recesses 192 and 193 are formed in the retainer members 187 and 188, respectively, to receive balls 194 and 196, respectively, for engagement with the cam surfaces 178 and 179, respectively. A collar 197 having a stop lug 198 is secured to the stem by means of a screw 202 and keys 203. A stop member 204 is secured to the yoke by means of cap screws 206 and is formed with stop shoulders 207 and 208 for engagement by the lug 198 to limit the rotational movement of the plug, and with shoulders 209 to permit axial movement and prevent rotational movement of the plug during unseating and reseating of same. A screw 211 is threaded into the yoke for engagement in recesses 212 formed in the sleeve 182 to provide axial adjustment of the sleeve on the yoke.

In the operation of the valve thus described, the plug is moved from its seated and closed position to an unseated and closed position by a counterclockwise movement of the handwheel stem, causing the incline surfaces 214 to act through the balls 196, retainer member 188, and stem 163 to unseat the plug. Further rotational movement in a counterclockwise direction causes the cam recesses 216 to engage the balls 194 to rotate the stem and plug to the unseated and open position. A further counterclockwise movement of the handwheel stem causes the cam incline surfaces 217 to act through the balls 194, retainer 187 and stem 163 to move the plug axially into its seated and open position.

A movement of the handwheel stem in a clockwise direction causes the cam incline surfaces 218 to act through the balls 196 to unseat the plug, then the recesses 216 act through the balls 194 to rotate the plug to its closed and unseated position, then the incline surfaces 219 act through the balls 194 to reseat the plug in closed position.

In each of the three forms of rotary plug valve constructions thus shown and described the cam surfaces provided on the operating stem act through ball retainer means for unseating, rotating and reseating the plug and toward either its closed or open position by turning the operating stem in a clockwise or counterclockwise direction, respectively, thereby providing a simple, compact and inexpensive plug actuating mechanism adapted for a long service life.

While this invention has been shown in several forms it is obvious to those skilled in the art that it is not so limited but is susceptible of various changes and modifictions without departing from the spirit thereof or the scope of the appended claims.

I claim:

1. An operating mechanism for a valve of the rotary type having a casing, a plug, and an actuating stem therefor substantially axially immovable, the stem having upper and lower cam surfaces the stem being journaled for rotational movement and having cam follower members comprising a sleeve and a cup-shaped portion cooperating with the upper and lower cam surfaces respectively, balls therefor, the said sleeve ccooperating with the said stem and mounted for axial movement thereon while held against rotational movement, abutment means for preventing the rotational movement of the sleeve by engagement therewith, the said cup shaped portion also cooperating with the stem and having a bottom and annular wall portions, a flange member secured to the latter wall portion and engaging the axially movable sleeve, the latter sleeve member having ball retaining pockets for the balls of the lower cam surfaces of the actuating stem, stop lugs cooperating with the wall portion of the said cup-shaped member, guide means to receive the said stop lugs, the contour of the cam surfaces of the said actuating stem determining the axial movement of the said cup-shaped portion while rotational movement thereof is inhibited by the said guide means.

2. A combined rotating and lifting mechanism for a valve of the rotary type, a rotatable and axially immovable actuating stem therefor, an axially movable rotatable cam follower member surrounding a portion of the said stem, the stem having upper and lower cam surfaces, a second cam follower member comprising an axially movable non-rotatable sleeve member interposed between said stem and the first named axially movable rotatable member, ball means movable on the upper and lower cam surfaces of the said stem interposed respectively between said stem and the said sleeve member and between the said axially movable rotatable cam follower member and the said stem, at least one of the cam surfaces extending in a substantially horizontal plane and having spaced apart indentations, the other of the cam surfaces having a horizontal surface portion and incline and decline portions whereby the said actuating stem cooperates with the said sleeve member to hold the said first named axially movable rotatable member against rotation upon predetermined movement of the said actuating stem to effect motion of the ball means relative to the upper and lower cam surfaces of the stem, and means for limiting rotation of the said first-named rotatable axially movable cam follower member upon such motion of the ball means taking place.

3. A combined valve rotating and lifting mechanism for a valve of the rotary type having a casing, an axially immovable handwheel, having a recessed portion, the said mechanism being disposed within said handwheel recessed portion, an actuating stem therefor, the said stem including a stud attached to the said handwheel, a ball cam member secured to the said stud, an axially movable sleeve member positioned non-rotatably within the recessed portion of the said handwheel, the said sleeve having means for engaging the said actuating stem, the said sleeve and stem having ball retaining means cooperating with the said cam member, means cooperating with the handwheel for adjusting the axial movement of the sleeve member, the cam surfaces of the cam member extending annularly to provide horizontal surface portions with oppositely inclined surfaces therebetween, one of the cam surfaces also having spaced apart indentations to hold the said ball cam member against relative rotation.

4. An operating mechanism for a rotary type of valve having a casing, a stem, a yoke secured to the casing for support of the operating mechanism, the latter including an axial cam with oppositely disposed cam surfaces, a sleeve member threadedly mounted on the said yoke, a handwheel mounted on the yoke, cam follower means comprising a ball retainer rotatable with the said stem and a second ball retainer non-rotatably journalled on the stem, stop means on the stem engageable with the yoke to limit rotational movement of the said stem, abutment means cooperating with the said yoke to permit predetermined axial and rotational movement of the said ball retainers.

5. An operating mechanism for a valve of the rotary type having a casing, a plug, and an actuating stem therefor substantially axially immovable, the said stem having end positioned upper and lower cam surfaces, the stem being journaled for rotational movement and having cam follower members comprising a sleeve and a cup-shaped portion cooperating with the said upper and lower cam surfaces respectively, balls therefor operable in a plurality of planes and arranged to move upon the stem cam surfaces, the said sleeve cooperating with the said stem and mounted for axial movement thereon while being held against rotational movement, means for preventing the rotational movement of the sleeve by engagement therewith, the said cup-shaped portion also cooperating with the stem and having a bottom and annular wall portions, the sleeve and cup-shaped portion having ball retaining pockets for the balls cooperating with the cam surfaces of the actuating stem, means for inhibiting rotation of the cup-shaped portion at predetermined rotational positions of the actuating stem, whereby initial movement of the said balls upon the cam surfaces of the stem effects axial movement of the sleeve, subsequent axial movement of the said cam follower members being restricted upon movement of the balls out of the retaining pockets whereupon the balls, the plug and the actuating stem are rotatable together.

6. A combined rotating and lifting mechanism for a valve of the rotary plug type, a rotatable and substantially axially immovable actuating stem therefor, an axially movable non-rotatable sleeve member supported by and surrounding a lower portion of the said stem, the stem having upper and lower cam surfaces, means comprising an axially movable retaining member also positioned around a lower portion of the stem and enclosing the first named axially movable non-rotatable sleeve member, ball means movable on the upper and lower cam surfaces of the said stem interposed respectively between said stem and the said retaining member and also between the said sleeve member and the said stem, at least one of the said cam surfaces extending in a substantially horizontal plane and having spaced apart indentations, the other of the cam surfaces having a horizontal surface portion together with incline and decline portions whereby the said actuating stem cooperates with the said retaining member to hold the said sleeve member against rotation upon predetermined rotative movement of the said actuating stem thereby to effect motion of the ball means relative to the upper and lower cam surfaces of the stem, the ball means engaging the indentations of the cam surfaces of the stem to inhibit relative rotational movement of the sleeve and retaining members, a portion of the said retaining member forming a cover for the said sleeve member and the cam surfaces of said actuating stem.

7. An operating mechanism for a valve of the rotary type, the combination of a casing, a bonnet, a housing for the bonnet, a plug, and an actuating stem therefor, the said stem having upper and lower cam surfaces and having cam follower members comprising an axially movable head portion and a sleeve member cooperating with the said upper and lower cam surfaces respectively, balls therefor, the said head portion cooperating with the said stem and being mounted thereon for axial movement while held against rotational movement, a flange portion on the sleeve member engaging the axially movable head portion, the said head portion having ball retaining pockets for predeterminedly receiving the balls of the lower cam surfaces of the actuating stem, stop lugs within the said housing for preventing rotation of the said sleeve member, other lugs between the bonnet and said housing to prevent rotation of the said head portion at predetermined times, the said stem having a shoulder portion engageable with the said head portion and having an opposite end portion journaled in the said housing whereby upon rotation of the said stem the shoulder portion moves the head portion axially to clear said lugs between the bonnet and housing so as to permit rotation of the said head portion simultaneous with the rotation of the said actuating stem and plug.

WILLIAM D. CARRIE.

REFERENCES CITED

The following references are of record in the file of this patent:

UNITED STATES PATENTS

| Number | Name | Date |
| --- | --- | --- |
| 1,715,176 | Stevens | May 28, 1929 |
| 1,864,596 | Jones | June 28, 1932 |
| 2,052,462 | Grissett | Aug. 25, 1936 |
| 2,078,231 | Brisbane | Apr. 27, 1937 |
| 2,314,759 | Bischoff | Mar. 23, 1943 |
| 2,327,425 | Hilker | Aug. 24, 1943 |
| 2,412,529 | Mueller | Dec. 10, 1946 |